United States Patent
Donaldson et al.

(10) Patent No.: US 10,409,667 B2
(45) Date of Patent: Sep. 10, 2019

(54) ERROR ASSIGNMENT FOR COMPUTER PROGRAMS

(71) Applicant: salesforce.com, inc., San Francisco, CA (US)

(72) Inventors: J. Justin Donaldson, Seattle, WA (US); Hormoz Tarevern, Mountain View, CA (US); Sadiya Hameed, Millbrae, CA (US); Siddharth Srivastava, San Francisco, CA (US); Feifei Jiang, Millbrae, CA (US)

(73) Assignee: salesforce.com, inc., San Francisco, CA (US)

( * ) Notice: Subject to any disclaimer, the term of this patent is extended or adjusted under 35 U.S.C. 154(b) by 173 days.

(21) Appl. No.: 15/624,000

(22) Filed: Jun. 15, 2017

(65) Prior Publication Data
US 2018/0365091 A1 Dec. 20, 2018

(51) Int. Cl.
*G06F 11/00* (2006.01)
*G06F 11/07* (2006.01)
*G06N 3/08* (2006.01)
*G06N 3/04* (2006.01)

(52) U.S. Cl.
CPC ........ *G06F 11/079* (2013.01); *G06F 11/0706* (2013.01); *G06F 11/0751* (2013.01); *G06F 11/0772* (2013.01); *G06N 3/04* (2013.01); *G06N 3/08* (2013.01)

(58) Field of Classification Search
CPC ............... G06F 11/079; G06F 11/0706; G06F 11/0751; G06F 11/0772; G06N 3/08
See application file for complete search history.

(56) References Cited

U.S. PATENT DOCUMENTS

| | | | | |
|---|---|---|---|---|
| 5,919,267 A * | 7/1999 | Umes | .................. | G06F 11/0736 714/26 |
| 6,072,777 A * | 6/2000 | Bencheck | ........... | H04L 41/0631 370/244 |
| 6,598,179 B1 * | 7/2003 | Chirashnya | ........... | G06F 11/079 714/19 |
| 7,996,723 B2 * | 8/2011 | Levine | ...................... | G06F 8/70 714/38.1 |
| 8,453,027 B2 * | 5/2013 | Bartz | .................. | G06F 11/0709 714/746 |
| 8,601,323 B2 * | 12/2013 | Tsantilis | ................ | G06F 11/366 714/42 |
| 8,706,451 B1 * | 4/2014 | Gross | .................. | G06F 11/0706 703/2 |
| 8,892,486 B2 * | 11/2014 | Isaiadis | .................... | G06N 3/08 706/25 |

(Continued)

*Primary Examiner* — Marc Duncan
*Assistant Examiner* — Jonathan D Gibson
(74) *Attorney, Agent, or Firm* — Fenwick & West LLP (57) ABSTRACT

An online system identifies an assignment for a computer program error indicated in an error message by applying an assignment model to token sequences identified in the error message. The error message includes a sequence of execution paths of the computer program. Each execution path indicates a function call active in computer memory when the error was generated. In other words, the error message allows tracking of the sequence of nested paths up to the point where the error was generated. In one example, the error message is a stack trace message that reports active stack frames in computer memory during the execution of the program.

18 Claims, 7 Drawing Sheets

(56) References Cited

U.S. PATENT DOCUMENTS

| | | | | |
|---|---|---|---|---|
| 8,966,435 | B2* | 2/2015 | Kleingon | G06F 8/10 709/217 |
| 2004/0059966 | A1* | 3/2004 | Chan | G06F 11/0709 714/48 |
| 2004/0078730 | A1* | 4/2004 | Ma | G06F 11/0727 714/54 |
| 2004/0199913 | A1* | 10/2004 | Perrow | G06F 11/0706 718/100 |
| 2011/0066908 | A1* | 3/2011 | Bartz | G06F 11/0709 714/746 |
| 2011/0154109 | A1* | 6/2011 | Levine | G06F 8/70 714/26 |
| 2011/0261049 | A1* | 10/2011 | Cardno | G06Q 10/10 345/419 |
| 2011/0264964 | A1* | 10/2011 | Murphy | G06F 11/0709 714/48 |
| 2012/0151278 | A1* | 6/2012 | Tsantilis | G06F 11/079 714/48 |
| 2012/0215728 | A1* | 8/2012 | Isaiadis | G06N 3/08 706/25 |
| 2017/0140271 | A1* | 5/2017 | Reed | G06N 3/0445 |
| 2017/0249551 | A1* | 8/2017 | Iljazi | G06F 3/0619 |
| 2018/0157548 | A1* | 6/2018 | Li | G06F 11/079 |
| 2018/0276912 | A1* | 9/2018 | Zhou | G07C 5/085 |
| 2018/0321980 | A1* | 11/2018 | Lo | G06F 9/4887 |
| 2018/0322365 | A1* | 11/2018 | Yehezkel Rohekar | G06K 9/6257 |

\* cited by examiner

ERROR ASSIGNMENT FOR COMPUTER PROGRAMS

BACKGROUND

Field of Art

The disclosure relates in general to error messages in computer programs, and more specifically to assigning error messages in computer programs to responsible parties.

Description of the Related Art

Software for large online systems often include a complex collection of computer programs, libraries, and related data. Large-scale software is often written in a collaborative manner, in which multiple parties or teams are responsible for managing different parts of the software. For example, at a high-level of division, a front-end web development team for a web-based application software may be responsible for managing the design of the website for the application, while a back-end database team may be responsible for updating user and content databases for the application. As another example, at a lower-level of division, multiple teams may be responsible for developing different tasks for a computer program.

Typically, when an error is generated in a computer program, the computer program generates an error message indicating the sequence of paths that were called during the execution of the computer program. The responsible party for the error can be identified by determining the source code of the path that generated the error, and identifying the responsible party for managing the source code. The error is assigned to the responsible party such that the error can be fixed. However, although the error message describes execution paths of the computer program, it is often difficult to determine which path actually caused the error, and thus, which party is responsible for fixing the error.

SUMMARY

An online system identifies an assignment for a computer program error indicated in an error message by applying an assignment model to token sequences identified in the error message. The error message includes a sequence of execution paths of the computer program. In one embodiment, each execution path indicates a function call active in computer memory when the error was generated. In other words, the error message allows tracking of the sequence of nested paths up to the point where the error was generated. In one embodiment, the error message is a stack trace message that reports active stack frames in computer memory during the execution of the program.

The online system identifies a plurality of token sequences in the error message. Each token sequence is associated with a particular sequence of programming identifiers (e.g., functions, methods, classes, modules) identified in the execution paths of the error message. An assignment for each token sequence is determined by applying the assignment model to the token sequence. The responsible party for the error message is determined based on the assignments for the plurality of token sequences. Thus, the assignment model essentially determines an assignment for the error based on the particular sequence of execution paths leading up to the error, as represented by the sequence of identifiers.

The assignment model is trained based on a training data set that includes previously generated error messages and the resulting parties that were identified as responsible for fixing the errors. Through the training data set, the assignment model learns which parties of the online system are responsible for errors generated by particular sequences of execution paths in the computer program. In one embodiment, the assignment model is a machine-learned neural network model including a plurality of nodes in each layer of the model, in which values at the plurality of nodes in a given layer is generated by applying a transformation to the values at the plurality of nodes in the previous layer.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

The figures use like reference numerals to identify like elements. A letter after a reference numeral, such as "102*a*," indicates that the text refers specifically to the element having that particular reference numeral. A reference numeral in the text without a following letter, such as "102," refers to any or all of the elements in the figures bearing that reference numeral.

Figure 1:
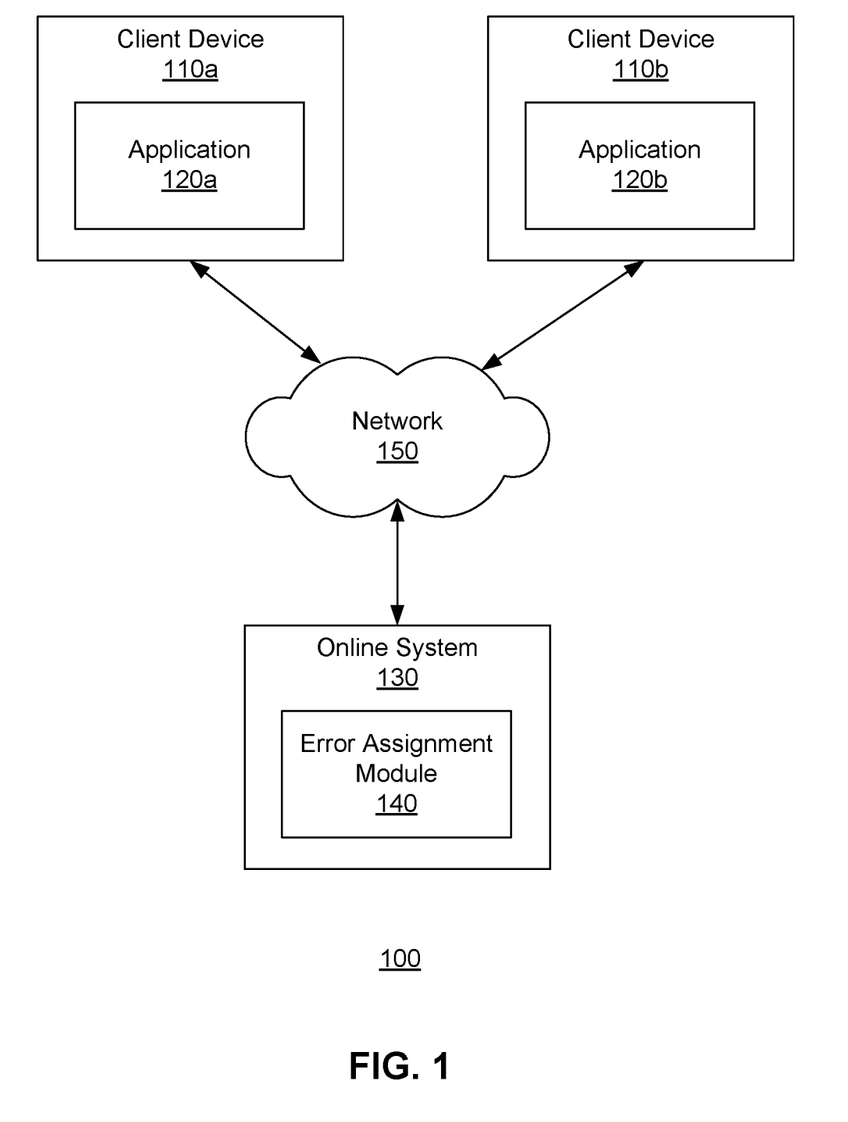
FIG. 1 is a high-level block diagram illustrating an embodiment of an environment for assigning errors in computer programs, in accordance with an embodiment.

FIG. 1 is a high-level block diagram illustrating an embodiment of an environment 100 for assigning errors in computer programs, in accordance with an embodiment. The environment 100 includes one or more client devices 110 connected by a network 150 to an online system 130. Here only two client devices 110*a*, 110*b* and one record management system 130 are illustrated but there may be multiple instances of each of these entities. For example, there may be thousands or millions of client devices 110 in communication with one or more online systems 130.

The network 150 provides a communication infrastructure between the client devices 110 and the record management system 130. The network 150 is typically the Internet, but may be any network, including but not limited to a Local Area Network (LAN), a Metropolitan Area Network (MAN), a Wide Area Network (WAN), a mobile wired or wireless network, a private network, or a virtual private network. Portions of the network 150 may be provided by links using communications technologies including WiFi based on the IEEE 802.11 standard, the BLUETOOTH short range standard, and the Wireless Universal Serial Bus (USB) standard.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to connect to the network 118 (e.g., via Wifi and/or 4G or other wireless telecommunication standards).

The client device 110 includes an application 120 that allows a user of the client device 110 to interact with the online system 130. For example, the application 120 could be a browser that allows a user of the client device 110 to interact with the online system 130 by browsing a web site of the online system 130. As another example, the application 120 could be a dedicated application specifically designed (e.g., by the organization responsible for the online system 130) to enable interactions with the online system 130 and its content. In one embodiment, the application 120 is a business management application, such as enterprise resource planning (ERP) application or customer relationship management (CRM) application that allows businesses to manage inventory of sales, client relationships, product planning, workflow, and the like.

Users of client devices 110 can be members of organizations, such as businesses and universities. The application 120 of a client device 110 allows members of an organization to perform various tasks and activities with the online system 130. For example, a user of client device 110a may be a member of an organization that uses the application 120 to update and retrieve inventory of sales stored in the online system 130 for the organization. As another example, a user of a client device 110a may use the application 120 to send correspondence to customers of the organization before a contract's end date. In such an instance, the client devices 110 request the online system 130 to perform the various tasks and activities through the application 120.

Users of client devices 110 can also be members of the online system 130, such as engineers, information technology (IT) specialists, and the like that are in charge of developing source code for components of the online system 130. The application 120 of a client device 110 allows members of the online system 130 to develop software components, and deploy the components on the online system 130. For example, a user of a client device 110b may be a software engineer of the online system 130 that uses the application 120b to develop customer management applications on the online system 130. As another example, a user of a client device 110b may be an IT specialist of the online system 130 that uses the application 120b to update and configure system software on the online system 130. In such an instance, the client devices 110 can request the online system 130 to compile and execute code for various computer programs.

The online system 130 is a computer system that includes software for performing a group of coordinated functions or tasks. The software may allow users of the online system 130 to perform certain tasks or activities of interest, or may include system software (e.g., operating systems) that provide certain functionalities and services to other software. In one particular embodiment referred throughout the remainder of the specification, the online system 130 includes web-based application software directed to customer relationship management (CRM) or enterprise resource planning (ERP). CRM or ERP software provides a collection of tools that allow users of the online system 130 to manage relationships between buyers, suppliers, service users, and the like that the users do business with.

The online system 130 receives requests from client devices 110 and executes computer programs associated with the received requests. For example, the online system 130 may execute computer programs responsive to a request from a client device 110 to send correspondence to a set of customer representatives. As yet another example, the online system 130 may execute computer programs responsive to a request from a client device 110 to display statistics on sales inventory for the organization. As yet another example, the online system 130 may execute computer programs responsive to a request from a client device 110 to test updates to various software components of the online system 130.

Software for the online system 130 can include a complex collection of computer programs, libraries, and related data that are written in a collaborative manner, in which multiple parties or teams are responsible for managing different components of the software. For example, one team may be responsible for managing sales inventory databases for an organization, while another team may be responsible for graphically displaying inventory statistics responsive to a request from a client device 110. Thus, even for a single request, a sequence of different source code written by multiple parties may be executed.

In one embodiment, the online system 130 includes an error assignment module 140 that identifies an assignment for a computer program error indicating the responsible party for analyzing, evaluating, and/or fixing the error. When an error is generated during execution of a computer program, the online system 130 generates an error message that indicates the sequence of nested paths that were called during the execution. The online system 130 identifies the source code of the path that generated the error, and determines the party that manages the corresponding source code as the responsible party. The error is notified to the responsible party such that the error can be fixed. However, although the error message describes execution paths of the computer program, it is often difficult to determine which path actually caused the error, and thus, which party is responsible for fixing the error. For example, the party managing the source code for the most recent path before the error was generated is often times not the responsible party for the error. In fact, the responsible party may be any party associated with the sequence of nested paths in the error message.

In one embodiment, the error message generated by the online system 130 includes the sequence of execution paths of the computer program. In other words, the error message allows tracking of the sequence of nested paths up to the point where the error was generated. In one embodiment, each execution path indicates a function call active in computer memory when the error was generated. The execution paths may also indicate other programming identifiers that represent other types of programming elements associated with the function call. For example, these may include modules or classes that include the definition of the functions, or other variables and parameters that were passed on with the function calls. In one particular embodiment referred throughout the remainder of the application, the error message is a stack trace message that reports the execution paths based on active stack frames in computer memory during the execution of the computer program.

Figure 2:
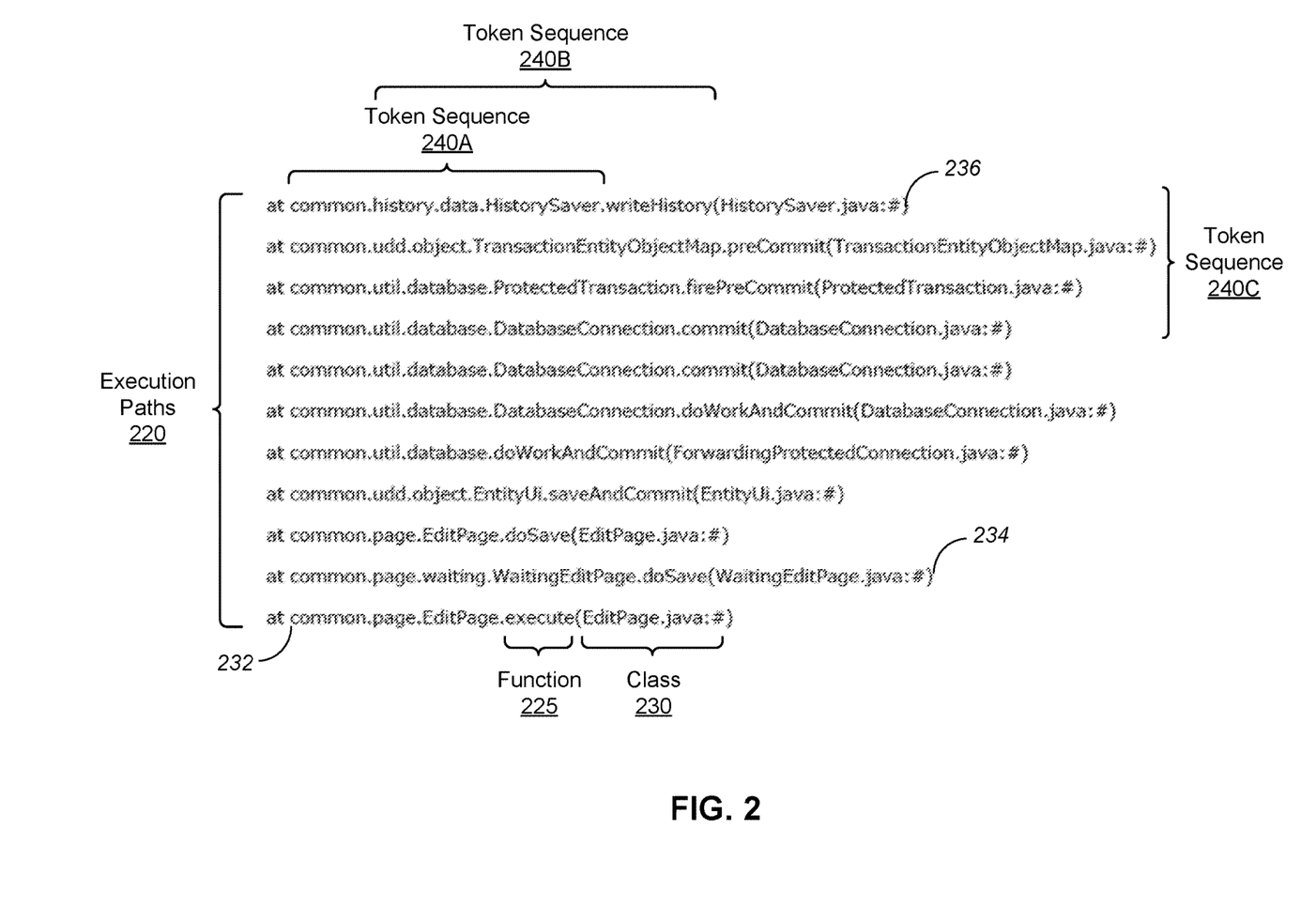
FIG. 2 is an example error message generated by the online system, in accordance with an embodiment.

FIG. 2 is an example error message generated by the online system 130, in accordance with an embodiment. The example error message shows a plurality of execution paths 220, each indicating a function call 225. In addition, each execution path 220 indicates identifiers, in particular JAVA classes 230, which are associated with the corresponding function call. The bottommost path ".execute" 232 is the most recent/last path called before the error occurred, with each path being invoked by the path above it. For example, the function ".execute" in class "EditPage" was invoked by function ".doSave" in class "WaitingEditPage of path 234"

In one embodiment, the online system 130 identifies an assignment for a computer program error by applying an assignment model to token sequences identified in the error message. Each token sequence includes a sequence of identifiers in the error message of a predetermined size, and indicates the order in which certain identifiers appear in the execution paths. Returning to the example in FIG. 2, a first token sequence 240A is identified in the first execution path 236 as "common, history, data, HistorySaver," and a second token sequence 240B is identified in the same execution path 236 as "history, data, HistorySaver, writeHistory." As another example, a third token sequence 240C is identified by extracting the class associated with each of the first four execution paths, given by "HistorySaver, TransactionEntityObjectMap, ProtectedTransaction, DatabaseConnection."

The online system 130 determines an assignment for each token sequence in the error message by applying the assignment model to the token sequence. The online system 130 determines the assignment for the error message based on the assignments of each of the token sequences identified in the error message. The assignment model essentially determines the assignment for the error based on the particular sequence of execution paths leading up to the error, as represented by the sequence of identifiers. In one embodiment, the online system 130 selects the assignment having the most likely failure among the assignments determined for the plurality of token sequences as the assignment for the error message. As another example, the online system 130 may select the assignment having the majority vote among the assignments determined for the plurality of token sequences.

Figure 3:
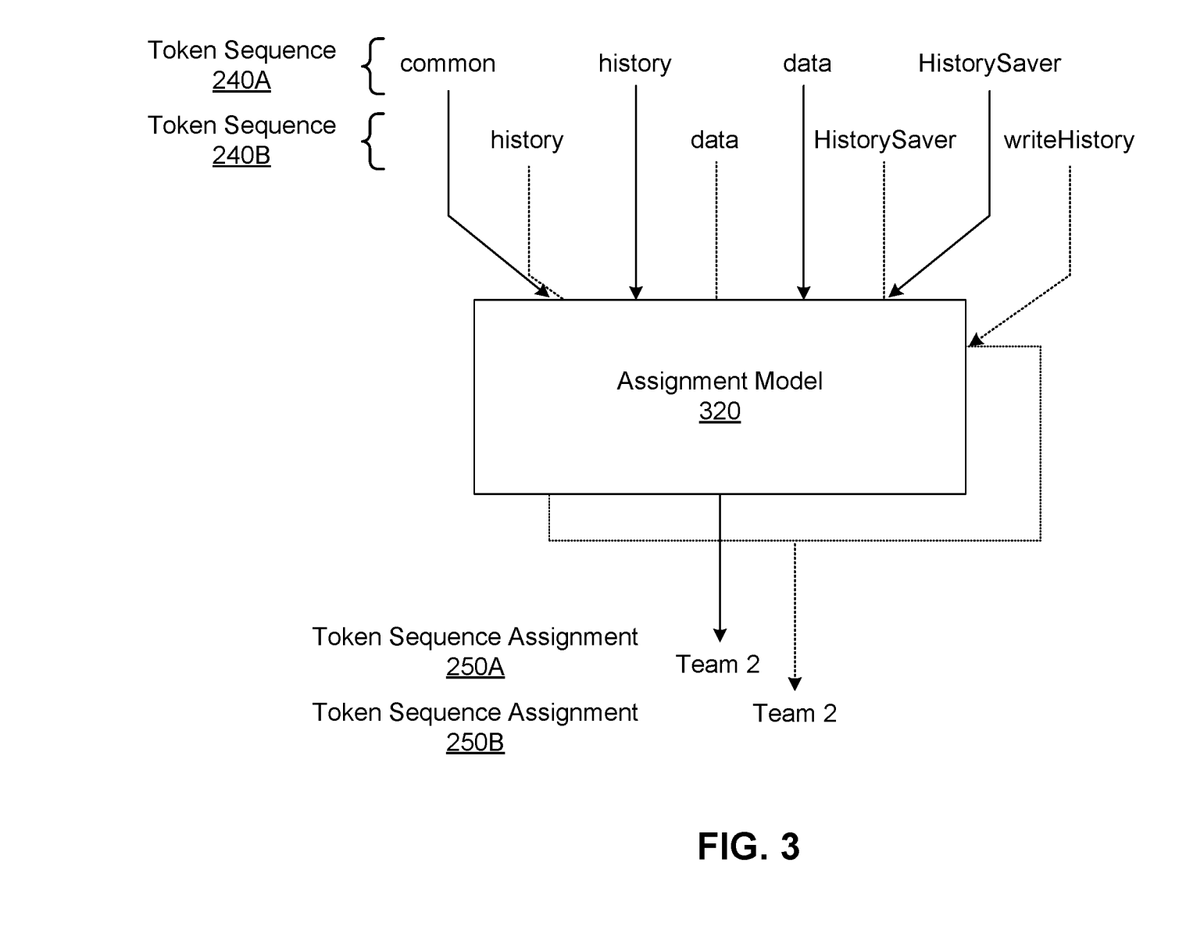
FIG. 3 illustrates an example process of determining assignments for token sequences.

FIG. 3 illustrates an example process of determining assignments for token sequences. As shown in FIG. 3, an assignment model 320 is applied to the first token sequence 240A and also applied to the second token sequence 240B. The assignment model 320 determines an assignment for each token sequence. In the example shown in FIG. 3, Team 2 is determined as the assignment 250A for token sequence 240A, and as the assignment 250B for token sequence 240B. The online system 130 determines the assignments for the remaining token sequences in the error message, and determines an assignment for the error based on the token sequence assignments. For example, the error message may be assigned to Team 2 if the majority of token sequences were assigned to Team 2 by the assignment model 320.

The assignment model is trained based on a training data set that includes previously generated error messages and the resulting parties that were identified as responsible for fixing the errors. Through the training data set, the assignment model learns which parties of the online system are responsible for errors generated by execution of particular sequences of execution paths in the computer program.

In one particular embodiment referred throughout the remainder of the specification, the assignment model is a machine-learned neural network model with layers of nodes, in which values at nodes of a current layer are a transformation of values at nodes of a previous layer. The transformation is determined through a set of weights connecting the current layer and the previous layer. The online system 130 encodes each token in the token sequence into a numerical vector, and determines the token sequence assignment based on the output of the assignment model. The output is generated by applying the transformations in the assignment model to the encoded token sequence at the input. In one embodiment, the output of the assignment model is generated by applying the same transformation to each token in a token sequence and combining the transformed token at a hidden layer between the input and output layer.

Figure 4:
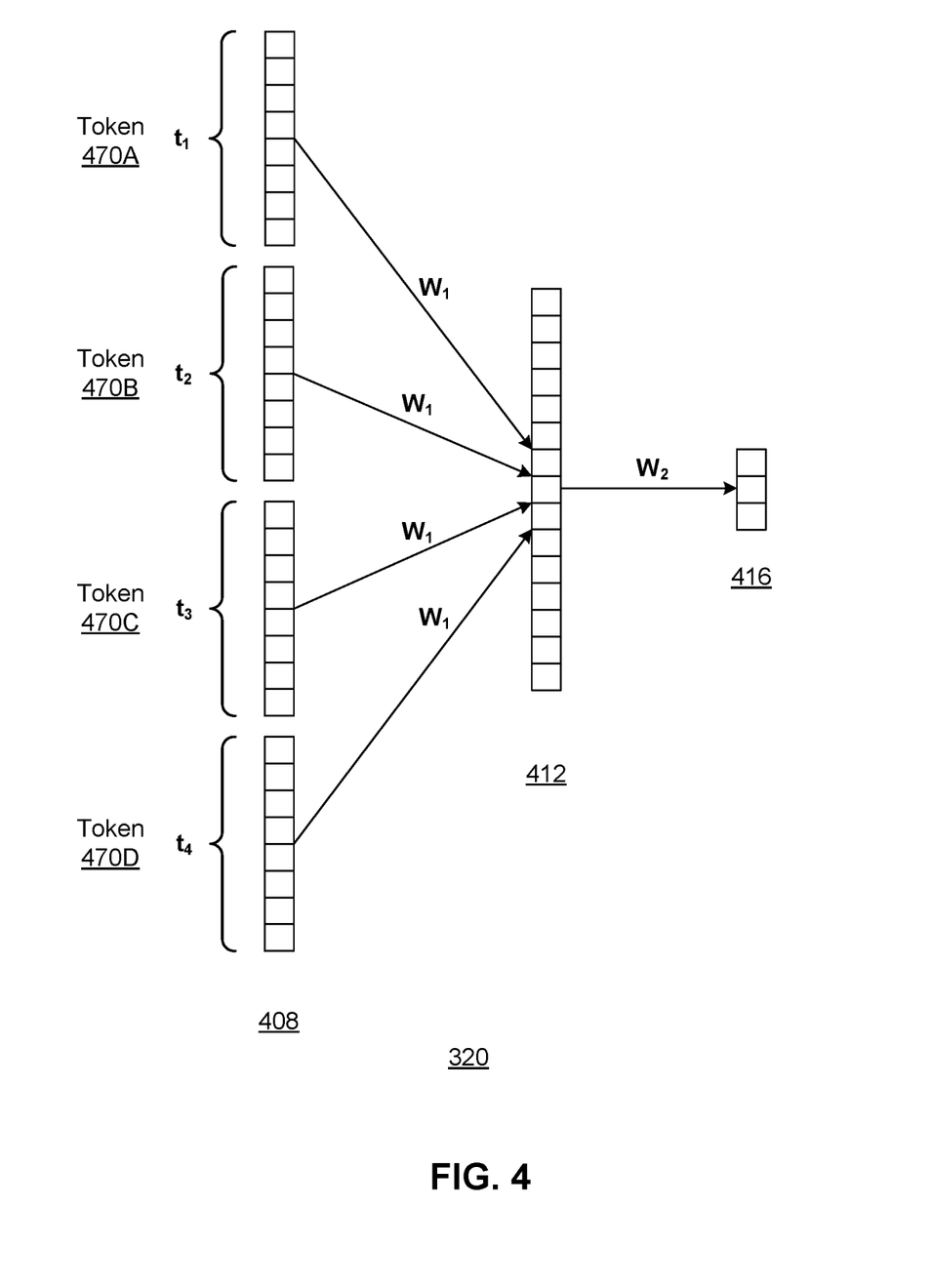
FIG. 4 illustrates an example assignment model, in accordance with an embodiment.

FIG. 4 illustrates an example assignment model 320, in accordance with an embodiment. The assignment model 320 includes an input layer 408, a hidden layer 412, and an output layer 416. The assignment model 320 generates an output based on an input of four tokens 470A, 470B, 470C, 470D in a token sequence. Token 470A is encoded as $t_1$, token 470B is encoded as $t_2$, token 470C is encoded as $t_3$, and token 470D is encoded as $t_4$. Each encoded token is associated with a set of nodes in the input layer 408, and are transformed by a set of weights $W_1$. The transformed inputs are combined at the hidden layer 412. The output is generated at the output layer 416 by applying a transformation $W_2$ to the values of the nodes at the hidden layer 412. The online system 130 determines the assignment for the token sequence based on the values of the output.

Figure 5:
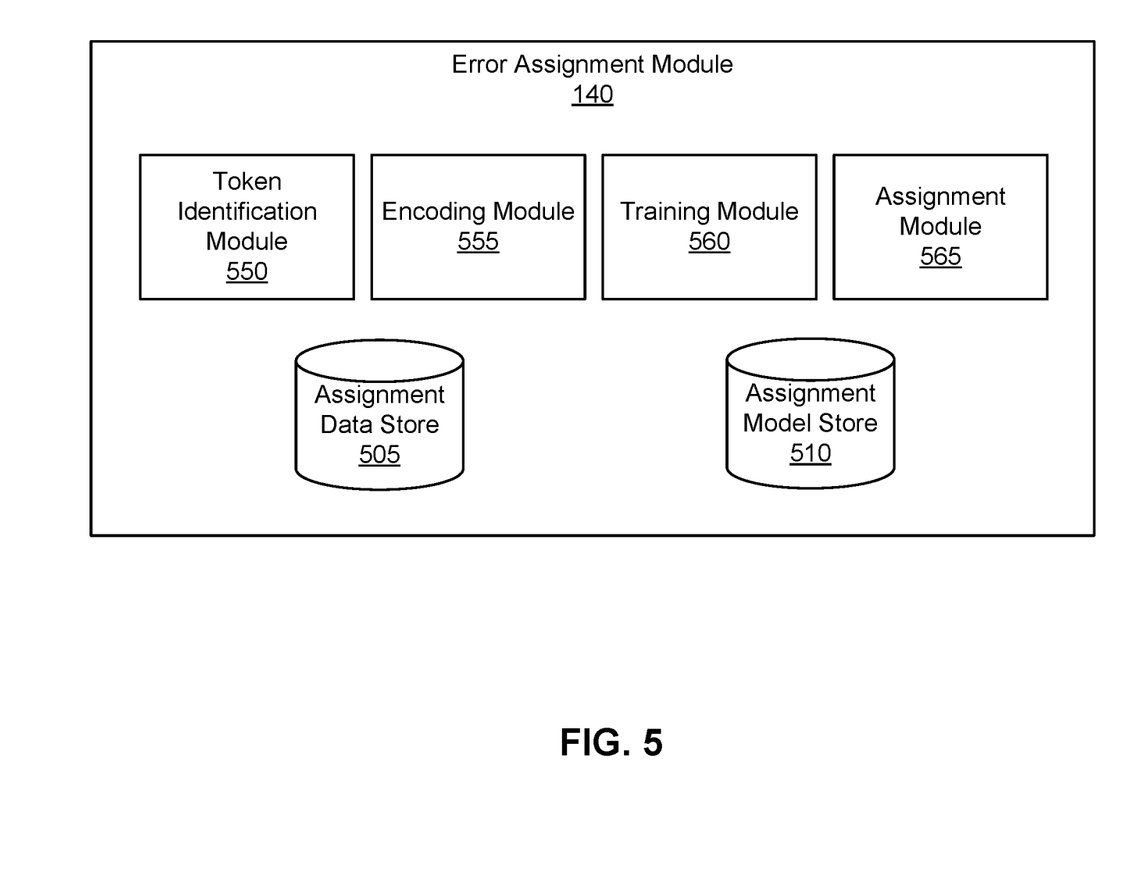
FIG. 5 is an example block diagram of an architecture of the error assignment module, in accordance with an embodiment.

FIG. 5 is an example block diagram of an architecture of the error assignment module 140, in accordance with an embodiment. The error assignment module 140 shown in FIG. 5 includes a token identification module 550, an encoding module 555, a training module 560, and an assignment module 565. The error assignment module 140 also includes an assignment data store 505 and an assignment model store 510. In other embodiments, the error assignment module 140 may include additional, fewer, or different components for various applications. Conventional components such as network interfaces, security functions, load balancers, failover servers, management and network operation consoles, and the like are not shown so as to not obscure the details of the system architecture.

The assignment data store 505 includes assignment data used to train the assignment model. Specifically, each instance i of the assignment data store 505 includes a previously generated error message and a corresponding party that was identified as responsible for addressing the errors.

The token identification module 550 receives error messages and identifies a plurality of token sequences in the error messages. The token sequences are composed of a predetermined number of tokens k identified in the error messages. In one embodiment, the token identification module 550 identifies a token sequence as a sequence of consecutive identifiers in the execution paths of an error message. In another embodiment, the token identification module 550 identifies a token sequence as a sequence of identifiers each associated with the same type of programming element in the execution paths of the error message. For example, the token identification module 550 may identify a sequence of function calls in each execution path as the token sequence. As another example, the token identification module 550 may identify a sequence of classes associated with the function call in each execution path as the token sequence. The token identification module 550 identifies the plurality of token sequences in error messages stored in the assignment data store 505, and error messages received from the assignment module 565. Specifically, an error message of data instance i in the assignment data store 505 may include a plurality of $n_i$ token sequences.

The encoding module 555 encodes token sequences identified in error messages into numerical vectors, and also encodes information in the assignment data store 505. In one embodiment, an encoded token vector t is represented by a one-hot encoded vector that represents a list of identifiers identified in the error messages of the assignment data store 505, in which only the element corresponding to the token has a non-zero value. The token vector t may have dimensionality corresponding to the number of identifiers, and each element may represent a unique identifier. In one embodiment, the encoding module 555 assigns the element corresponding to the token a value of 1, and 0 for the remaining elements. For example, a token vector t for a token "doSave" among a group of 5 identifiers "common, history, database, doSave, database" may be represented as [0 0 0 1 0], where the fourth element corresponds to the token. A token sequence $ts_j^i$, j=1, 2, . . . , $n_i$ in error message i of the assignment data store 505 may include token vectors $t_{1j}, t_{2j}, \ldots, t_{kj}$. In one embodiment, the token sequence $ts_j^i$ can be represented as the concatenation of the corresponding token vectors $[t_{1j}\ t_{2j}\ \ldots\ t_{kj}]$.

The encoding module 555 also encodes the assignment associated with each error message in the assignment data store 505 as a numerical vector or scalar. In one embodiment, an encoded assignment vector a for an assignment is represented by a one-hot encoded vector that represents a list of parties of the online system 130, in which only the element corresponding to the assignment has a non-zero value. The assignment vector a may have dimensionality corresponding to the number of parties, and each element may represent a unique party. In one embodiment, the encoding module 555 assigns the element corresponding to the assignment a value of 1, and 0 for the remaining elements. For example, an assignment vector a for a party "Team 3" among a group of 3 teams "Team 1, Team 2, Team 3" may be represented as [0 0 1], where the third element corresponds to the assignment. The token sequences $ts_j^i$ of error message i in the assignment data store 505 may each be associated with the assignment vector $a_i$ indicating the responsible party for error message i.

The training module 560 trains the assignment model based on encoded information from the assignment data store 505. Specifically, during the training process, the training module 560 determines the weights for the assignment model. In each training step, the training module 560 adjusts values for weights of the assignment model to minimize or reduce a loss function between outputs generated by propagating encoded token sequences through the neural network model and the assignment vectors associated with the token sequences. Specifically, the loss function indicates difference between the assignment vectors and the generated outputs, and minimizing the loss function aims to generate outputs that resemble the known assignment vectors.

Specifically, a set of weights in the assignment model represents a matrix multiplication transformation between the connected nodes. When values at nodes of a layer are represented as a vector, the output at the subsequent layer is generated by matrix multiplying the values at the previous layer with the corresponding matrix of weights connecting the two layers. Mathematically, a vector $z_m$ at layer m of the assignment model may be generated by the transformation:

$$z_m = f_m(W_m \cdot z_{m-1})$$

where $z_{m-1}$ is a vector at the previous layer m−1, $W_m$ is the matrix of learned weights connecting layer m−1 to layer m, and $f_m(\bullet)$ is an activation function associated with layer m Returning to the example assignment model of FIG. 4, the output $f(ts_j)$ generated at the output layer 416 for a given token sequence vector $ts_j$ may be expressed as:

$$f(ts_j) = f_3(W_2 \cdot f_2(W_1' \cdot ts_j))$$

$$= f_3\left(W_2 \cdot f_2\left(\sum_{p=1}^{k} W_1 \cdot t_{pj}\right)\right),$$

where $t_{pj}$ indicates a token vector associated with the token sequence vector $ts_j$, $f_2(\bullet)$ is the activation function at the hidden layer 412, $f_3(\bullet)$ is the activation function at the output layer 416, and $W_1'$ is the matrix $[W_1\ W_1\ \ldots\ W_1]$ given by concatenating $W_1$ k times.

The loss function is determined across multiple data instances i∈S in a subset of instances in the assignment data store 505. In one embodiment, the loss function can be expressed as:

$$\ell(a_{i \in S}, f(ts_j^{i \in S})) = \sum_{i \in S} \sum_{j=1}^{n_i} \| a_i - f(ts_j^i) \|_2^2$$

where $a_i$ denotes the assignment vector for data instance i, and $f(ts_j^i)$ denotes the output of the assignment model generated by propagating a token sequence vector $ts_j^i$ of the error message i through the assignment model using the current set of weight estimates. However, it is appreciated that other forms of loss functions can be used in addition to that described above.

The assignment module 565 receives an error message generated by the online system 130 for which the responsible party is unknown, and determines an assignment for the error using the assignment model. The assignment module 565 requests and receives a plurality of encoded token sequences from the token identification module 550 and the encoding module 555. The assignment module 565 determines the assignment of the error message based on the output generated by applying the assignment model to the input of token sequences. In one embodiment, the assignment module 565 determines the assignment for a token sequence $ts_j$ by selecting the responsible party corresponding to the element of the output vector $f(ts_j)$ having the highest value. For example, given an output vector [0.2 0.1 0.25 0.12 0.80] among a group of five parties, the assignment module 565 may select the fifth team as the responsible party for the token sequence.

In one embodiment, the assignment module 565 selects the assignment having the highest number among the assignments determined for the plurality of token sequences as the assignment for the error message. The assignment module 565 transmits a notification to one or more users associated with the assignment determined for the error message. The notification includes the error message and an indication of the assignment.

Figure 6:
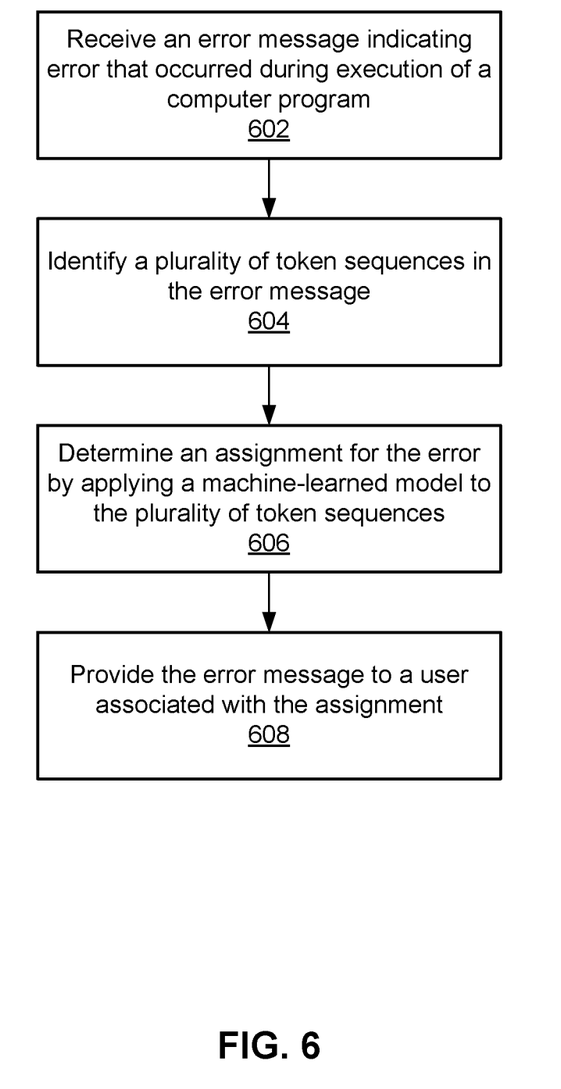
FIG. 6 is a flowchart illustrating a method of determining an assignment for a computer program error, in accordance with an embodiment.

FIG. 6 is a flowchart illustrating a method of determining an assignment for a computer program error, in accordance with an embodiment. An error message is received 602 indicating an error that occurred during execution of a computer program. The error message includes a sequence of execution paths of the computer program. Each execution path represents a function call active in computer memory when the error was generated. A plurality of token sequences are identified 604 in the error message. Each token sequence includes a sequence of token identifiers identified from the execution paths of the error message. An assignment for the error is determined 606 by applying a machine-learned model to the identified plurality of token sequences. The error message is provided 608 to a user associated with the assignment.

Those of skill in the art will recognize that other embodiments can perform the steps of FIG. 6 in different orders. Moreover, other embodiments can include different and/or additional steps than the ones described herein.

Figure 7:
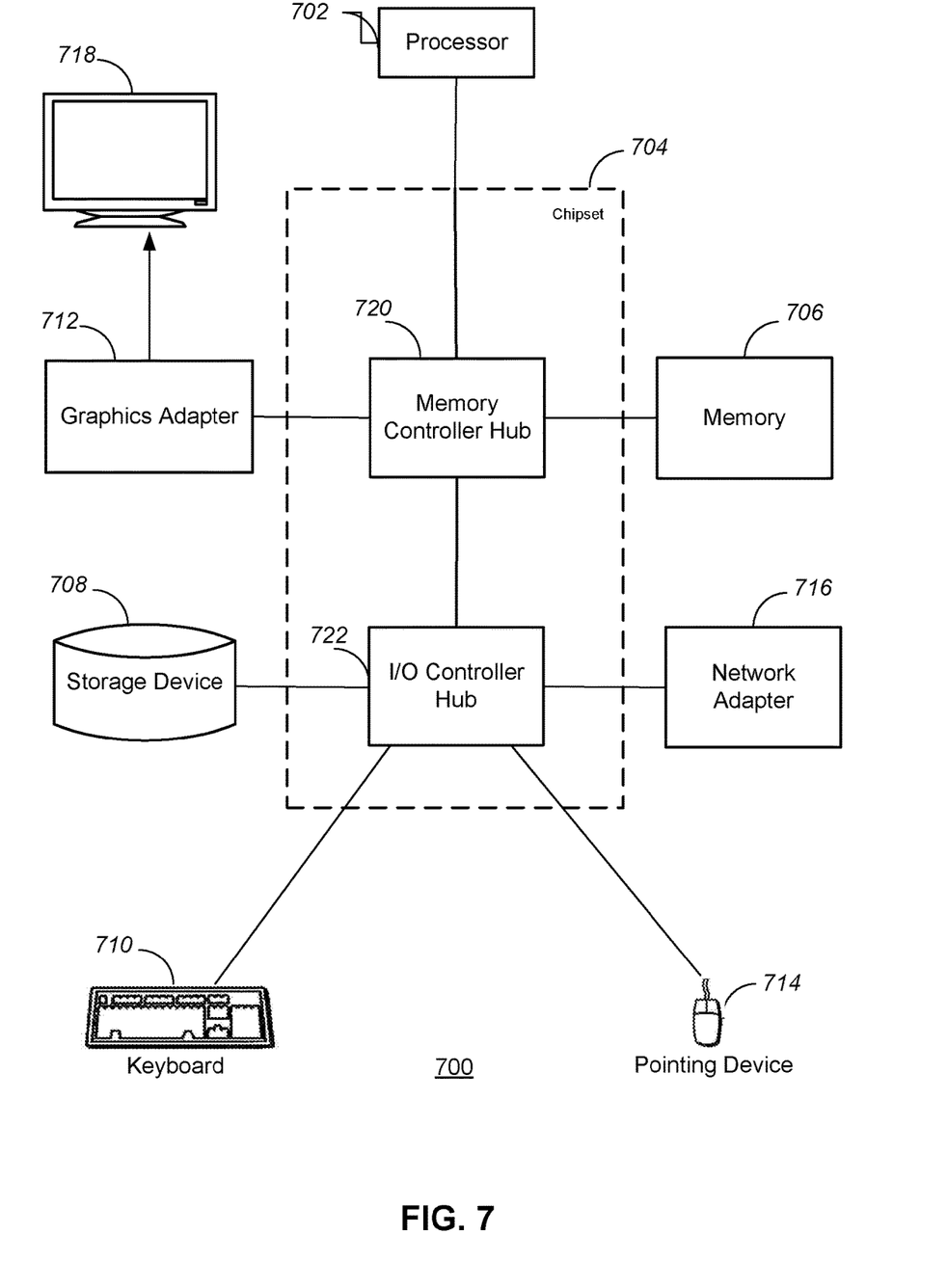
FIG. 7 is a high-level block diagram illustrating an example computer 700 for implementing the client device and/or the online system of FIG. 1.

FIG. 7 is a high-level block diagram illustrating an example computer 700 for implementing the client device 110 and/or the online system 130 of FIG. 1. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, an input device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The input interface 714 is a touch-screen interface, a mouse, track ball, or other type of pointing device, a keyboard, or some combination thereof, and is used to input data into the computer 700. In some embodiments, the computer 700 may be configured to receive input (e.g., commands) from the input interface 714 via gestures from the user. The graphics adapter 712 displays images and other information on the display 718. The network adapter 716 couples the computer 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702.

The types of computers 700 used by the entities of FIG. 1 can vary depending upon the embodiment and the processing power required by the entity. The computers 700 can lack some of the components described above, such as graphics adapters 712, and displays 718. For example, the online system 130 can be formed of multiple blade servers communicating through a network such as in a server farm.

We claim:

1. A computer implemented method, comprising:
receiving an error message indicating error that occurred during execution of a computer program, wherein the error message includes a sequence of execution paths of the computer program;
extracting a plurality of token sequences in the error message, wherein each token sequence includes a sequence of token identifiers identified from the execution paths of the error message;
generating an output by applying a neural network model to the extracted plurality of token sequences;
determining an assignment for the error indicated by the error message based on the output of the neural network model; and
providing the error message and corresponding error assignment record to a user associated with the assignment.

2. The computer implemented method of claim 1, wherein each execution path from the sequence of execution paths represents a function call active in computer memory when the error was generated.

3. The computer implemented method of claim 1, further comprising encoding each token identifier from the plurality of token sequences into a one-hot encoded vector.

4. The computer implemented method of claim 1, wherein each token sequence in the plurality of token sequences includes token identifiers corresponding to a same programming element type.

5. The computer implemented method of claim 4, wherein each token sequence includes token identifiers corresponding to an object-oriented class programming element.

6. The computer implemented method of claim 1, wherein the error message is a stack trace message that reports active stack frames in computer memory during execution of the computer program.

7. A non-transitory computer readable storage medium comprising computer executable code that when executed by one or more processors causes the one or more processors to perform operations comprising:
receiving an error message indicating error that occurred during execution of a computer program, wherein the error message includes a sequence of execution paths of the computer program;
identifying a plurality of token sequences in the error message, wherein each token sequence includes a sequence of token identifiers identified from the execution paths of the error message;
generating an output by applying a neural network model to the identified plurality of token sequences.
determining an assignment for the error indicated by the error message based on the output of the neural network model; and
providing the error message to a user associated with the assignment.

8. The non-transitory computer readable storage medium of claim 7, wherein each execution path from the sequence of execution paths represents a function call active in computer memory when the error was generated.

9. The non-transitory computer readable storage medium of claim 7, wherein the computer executable code further causes the one or more processors to perform operations comprising encoding each token identifier in the plurality of token sequences into a one-hot encoded vector.

10. The non-transitory computer readable storage medium of claim 7, wherein each token sequence in the plurality of token sequences includes token identifiers corresponding to a same programming element type.

11. The non-transitory computer readable storage medium of claim 10, wherein each token sequence includes token identifiers corresponding to an object-oriented class programming element.

12. The non-transitory computer readable storage medium of claim 7, wherein the error message is a stack trace message that reports active stack frames in computer memory during execution of the computer program.

13. A system comprising:
one or more computer processors; and
a non-transitory computer readable storage medium comprising computer executable code that when executed by the one or more processors causes the one or more processors to perform operations comprising:
receiving an error message indicating error that occurred during execution of a computer program, wherein the error message includes a sequence of execution paths of the computer program;
identifying a plurality of token sequences in the error message, wherein each token sequence includes a sequence of token identifiers identified from the execution paths of the error message;
generating an output by applying a neural network model to the identified plurality of token sequences;
determining an assignment for the error indicated by the error messaged based on the output of the neural network model; and
providing the error message to a user associated with the assignment.

14. The system of claim 13, wherein each execution path from the sequence of execution paths represents a function call active in computer memory when the error was generated.

15. The system of claim 13, wherein the computer executable code further causes the one or more processors to perform operations comprising encoding each token identifier from the plurality of token sequences into a one-hot encoded vector.

16. The system of claim 13, wherein each token sequence in the plurality of token sequences includes token identifiers corresponding to a same programming element type.

17. The system of claim 13, wherein each token sequence includes token identifiers corresponding to an object-oriented class programming element.

18. The system of claim 13, wherein the error message is a stack trace message that reports active stack frames in computer memory during execution of the computer program.

* * * * *

UNITED STATES PATENT AND TRADEMARK OFFICE
CERTIFICATE OF CORRECTION

PATENT NO. : 10,409,667 B2  
APPLICATION NO. : 15/624000  
DATED : September 10, 2019  
INVENTOR(S) : J. Justin Donaldson et al.

Page 1 of 1

It is certified that error appears in the above-identified patent and that said Letters Patent is hereby corrected as shown below:

In the Claims

In Column 10, Claim 7, Line 43: "to the identified plurality of token sequences." to read as --to the identified plurality of token sequences;--

Signed and Sealed this
Eighth Day of September, 2020

Andrei Iancu
*Director of the United States Patent and Trademark Office*